United States Patent
Lambert

[11] 3,913,431
[45] Oct. 21, 1975

[54] CUTTING MACHINE FOR FRICTION MATERIAL

[76] Inventor: Arthur Harold Lambert, 37 Parkland Crescent, Whangarei, New Zealand

[22] Filed: Feb. 8, 1974

[21] Appl. No.: 440,817

[30] Foreign Application Priority Data
Feb. 9, 1974    New Zealand............... 169765

[52] U.S. Cl. ............... 83/100; 83/425; 83/477.2; 83/564
[51] Int. Cl.² ............... B26D 5/02; B27G 19/02
[58] Field of Search ....... 83/54, 100, 187, 430, 446, 83/471, 477, 477.1, 477.2, 564, 924; 82/46, 58, 60, 85, 101

[56] References Cited
UNITED STATES PATENTS

| | | | |
|---|---|---|---|
| 1,939,925 | 12/1933 | Schwartz | 83/100 |
| 2,372,699 | 4/1945 | Wiken et al. | 83/100 |
| 2,563,059 | 8/1951 | Oas | 83/477 X |
| 3,460,419 | 8/1969 | Branick | 83/187 X |

*Primary Examiner*—J. M. Meister
*Assistant Examiner*—Fred A. Silverberg
*Attorney, Agent, or Firm*—Ryder, McAulay, Fields, Fisher & Goldstein

[57] ABSTRACT

A cutting machine, particularly applicable to the cutting of curved, friction material, is provided. The cutting table of the machine is of tubular configuration, to allow for drawing off of waste friction material and, further, to provide a curved surface on which the curved friction material can be easily accommodated.

4 Claims, 4 Drawing Figures

CUTTING MACHINE FOR FRICTION MATERIAL

This invention relates to a cutting machine which is particularly applicable to the cutting of friction material for brake linings.

Friction material for brake linings is normally provided in bulk in (1) large rolls, (2) rigid radiused segments or (3) in flat sheets. An inherent curve is set in the material (i.e. rolled and rigid segments) which allows easier application of the material to the curved surface of a brake shoe. This curvature of the material does, however, make the cutting thereof difficult with known types of sawing appliances. A further problem associated with the cutting of friction material is the large quantity of dust created during the cutting operation which presents a health hazard. The dust being of a fine nature creates a cleaning problem unless it can be contained in some manner.

The aim of the present invention is to provide a cutting machine for the cutting of friction or other material which by virtue of its design and construction helps to alleviate the above difficulties associated with the cutting of friction material.

Broadly the invention consists of a cutting machine comprising a stand, a driven circular saw blade mounted on said stand, a hollow cutting table within which the said saw blade is partially contained and an extractor connected in communication with the interior of the cutting table.

In the following description of the invention reference will be made to the accompanying drawings in which:-

Figure 1:
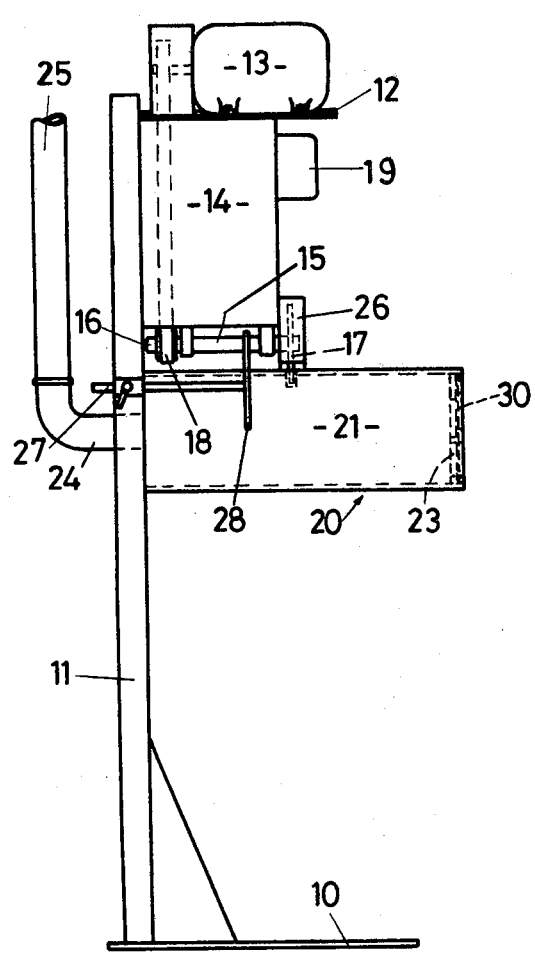
FIG. 1 is a front elevational view of one form of the invention.
Figure 2:
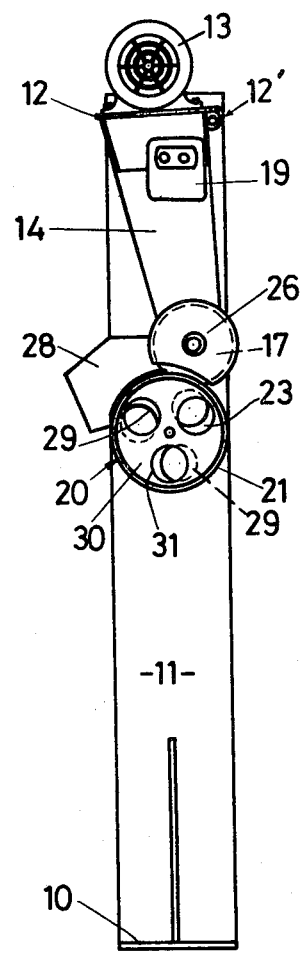
FIG. 2 is an end view of the form shown in FIG. 1.
Figure 4:
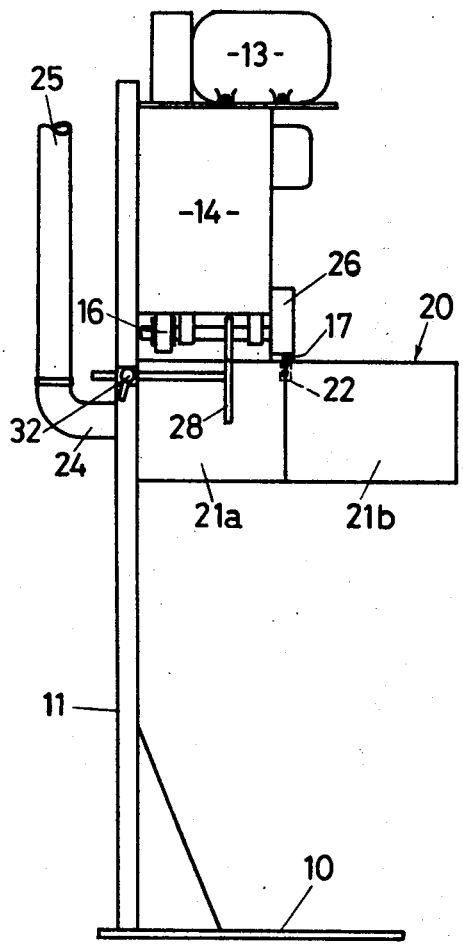
FIG. 4 is a front elevational view of a modified form of the invention.
Figure 3:
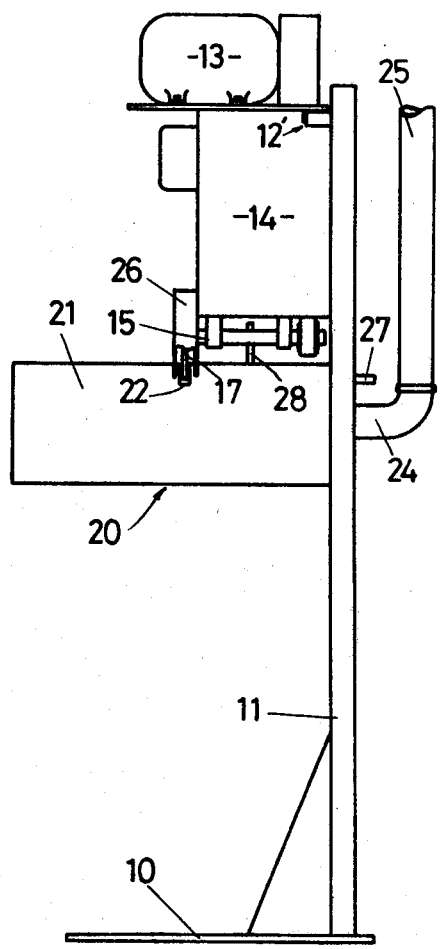
FIG. 3 is a rear elevational view with the blade guard partially removed.

In more fully describing the invention as a preferred embodiment the stand consists of a base plate 10 having a vertical pillar or column 11 projecting therefrom. Projecting transversely from the column 11 is an engine mounting plate 12 on which an electric motor 13 can be affixed. A guard 14 extends downwardly from the mounting plate 12 and carries at its lower extremity a shaft 15 suitably mounted in bearings. One end of the shaft 15 is provided with a pulley wheel 16 whilst the other end, which projects beyond the guard 14 is adapted to carry a circular saw blade 17. A belt drive 18 connects the pulley 16 to the output shaft of the electric motor 13. A stop-start switch box 19 is carried on the side of the guard 14. The engine mounting plate 12 is pivotally attached to the column 11 by a suitable pivot mounting, shown generally at 12', which allows the engine, guard, shaft etc. to move together and so swing the saw blade 17 away from the cutting table 20.

Attached to and extending outwardly at right angles from the column 11 is the cutting table 20 which consists of a steel tube 21. The axis of the tube 21 is parallel to the axis of the shaft 15 and the tube extends from the column 11 to terminate a distance beyond the saw blade 17. A slot 22 is provided around the top peripheral portion of the tube 21 whereby the saw blade 17 can enter into the said tube.

The outer end of the tube 21 is blanked off by an end plate 23. This end plate is provided with openings 29 and has concentrically mounted thereon a pivotal cover plate 30 which has openings 31 corresponding to those of the end plate 23. The purpose of the cover and end plates will become apparent from the following description.

The end of the tube 21 where it is attached to the column 11 is connected to an outlet pipe 24. This outlet pipe 24 is in turn connected by flexible hosing or piping 25 to an extractor (not shown).

A safety guard 26 is provided to cover the saw blade 17 and extends nearly right onto the outer surface of the cutting table 20. The gap left between the bottom of the guard 26 and the cutting table 20 is sufficient to allow friction material to be fed onto the saw blade 17. The saw blade is preferably an 8000 r.p.m. carbide tipped type.

An adjustable guide plate 28 is provided adjacent the saw blade 17 to permit accurate cutting of different widths of material. The guide plate 28 is constructed from sheet metal and has an arcuate edge which mates with the outer periphery of the cutting table 20. A shaft 27 extends from the plate 28 and is adjustably mounted in a bearing 32 mounted on the column 11 whereby the position of the plate 28 along the cutting table 20 can be altered as desired.

In another form of the invention the cutting table 20 consists of a two piece steel tube. The first section 21a extends from the column 11 to terminate at a point substantially directly below the saw blade 17. The second section 21b is joined coaxially with the first section 21a and extends beyond the saw blade 17 for some distance. The slot 22 in which the saw blade engages is formed in the joint between the two sections of the cutting table. The second section 21b is detachably mounted on the first section 21a to facilitate changing of the saw blade 17.

In this form of the invention the motor and saw blade arrangement is fixedly attached to the column 11 rather than being pivotably mounted as in the first embodiment.

As previously mentioned friction material is normally provided in large rolls and rigid radiused segments so that the material has a natural curve, in it. To cut the material into a strip the guide plate 26 is adjusted for the correct width and with the edge of the material butted against the plate it is fed over the cutting table 20 and onto the saw blade 17. One method of feeding the material is, for example, by hand. The dust particles created by the cutting operation fall inside the cutting table 20, due to the saw blade 17 being partially embedded therein, and are carried away by the suction of the extractor. The degree of suction applied can be varied by movement of the pivoted cover plate 30 on the outer end of the cutting table 20 so that the openings 29 and 31 overlap by varying amounts.

I claim:

1. A cutting machine comprising a stand which includes a vertical upright member, a driven circular saw blade mounted on said stand, a hollow cutting table in the form of tube which extends horizontally from said upright member, a slot formed in the upper surface of the tube within which a portion of the cutting edge of the saw blade is received, an outlet at the end of the tube adjacent the upright member which is in communication with the interior of the tube, extractor means connected to the said outlet, an end plate on the outer end of the tube which includes at least one opening, and a pivotal cover plate mounted concentrically on the end plate, said cover plate having an opening or openings which correspond to the opening or openings of the said end plate.

2. A cutting machine as claimed in claim 1 wherein a motor driving the saw balde is mounted on an engine mounting plate pivotally attached to the upright member of the stand, a guard extending downwardly from the engine mounting plate and terminating above the cutting table, a shaft mounted in bearings on the lower end of the guard and being belt driven from the motor, the said shaft being aligned parallel with the cutting table and carrying on one end thereof the saw blade.

3. A cutting machine as claimed in claim 2 wherein an adjustable guide plate is provided adjacent the saw blade said guide plate having an arcuate edge which corresponds substantially with the curvature of the outer surface of the cutting table, a shaft extending from said plate and being adjustably held in a bearing on the upright member whereby the guide plate can be adjustably moved along the cutting table.

4. A cutting machine as claimed in claim 3 wherein the saw blade is covered by a safety cover which covers the entire exposed surfaces of the blade except for a small gap between the lower extremity of the cover and the cutting table sufficient to allow the passage therebetween of friction material.

* * * * *